US008593279B2

(12) United States Patent
Dreuillet et al.

(10) Patent No.: US 8,593,279 B2
(45) Date of Patent: Nov. 26, 2013

(54) SYSTEM FOR DETECTING PERSONS IN A DEFINED SPACE

(75) Inventors: Philippe Dreuillet, Fontenay les Briis (FR); Gérard Bobillot, Buc (FR); Luc Vignaud, Paris (FR); François Tardivel, Bourg la Reine (FR); Florin Paun, Issy-les-Moulineaux (FR)

(73) Assignees: Office National d'Etudes et de Recherches Aerospatiales (ONERA), Chatillon (FR); ISITEK, Versailles (FR)

( * ) Notice: Subject to any disclaimer, the term of this patent is extended or adjusted under 35 U.S.C. 154(b) by 633 days.

(21) Appl. No.: 12/817,942

(22) PCT Filed: Dec. 16, 2008

(86) PCT No.: PCT/FR2008/052309
§ 371 (c)(1),
(2), (4) Date: Sep. 1, 2010

(87) PCT Pub. No.: WO2009/081018
PCT Pub. Date: Jul. 2, 2009

(65) Prior Publication Data
US 2010/0321184 A1 Dec. 23, 2010

(30) Foreign Application Priority Data
Dec. 20, 2007 (FR) ..................................... 07 60143

(51) Int. Cl.
*G08B 13/00* (2006.01)
*G01S 13/00* (2006.01)
*H01Q 1/38* (2006.01)
*H04B 1/00* (2006.01)

(52) U.S. Cl.
USPC ........... 340/541; 340/552; 340/553; 340/567; 342/27; 342/28; 455/68

(58) Field of Classification Search
USPC ......................................................... 340/541
See application file for complete search history.

(56) References Cited

U.S. PATENT DOCUMENTS

| 4,087,814 | A |   | 5/1978  | Spirig           |         |
|-----------|---|---|---------|------------------|---------|
| 4,527,151 | A |   | 7/1985  | Byrne            |         |
| 4,625,329 | A | * | 11/1986 | Ishikawa et al.  | 382/104 |
| 5,491,467 | A |   | 2/1996  | Tracy et al.     |         |
| 5,905,436 | A |   | 5/1999  | Dwight et al.    |         |
| 6,122,486 | A | * | 9/2000  | Tanaka et al.    | 455/68  |

(Continued)

FOREIGN PATENT DOCUMENTS

| DE | 199 26 845 A1 | 10/2000 |
|----|---------------|---------|
| WO | 93/19385 A1   | 9/1993  |
| WO | 03/054333 A2  | 7/2003  |

*Primary Examiner* — Jennifer Mehmood
*Assistant Examiner* — Fekadeselassie Girma
(74) *Attorney, Agent, or Firm* — Blank Rome LLP

(57) ABSTRACT

System (10) for detecting the position of a mobile or immobile entity (20) in a defined space (30), characterized in that it includes:
 means (40) of detecting the presence of said entity in at least two partially overlapping observation areas (Z1, Z2) of said space, said means being adapted for collecting at least one piece of immobile presence information (Ip) and one piece of movement information (Im) of said entity in each of said observation areas,
 processing means (50) which are adapted for carrying out logic operations on at least a portion of said information collected for each of said observation areas,
 decision means (60), which are connected to the processing means and adapted for controlling an action on the basis of a logic signal generated by the processing means.

16 Claims, 9 Drawing Sheets

(56) References Cited

U.S. PATENT DOCUMENTS

| | | | |
|---|---|---|---|
| 6,323,773 B1 * | 11/2001 | Runyon et al. | 340/573.1 |
| 6,384,414 B1 * | 5/2002 | Fisher et al. | 250/339.14 |
| 6,791,461 B2 * | 9/2004 | Oku et al. | 340/573.1 |
| 7,126,477 B2 * | 10/2006 | Gallivan et al. | 340/567 |
| 2003/0121704 A1 * | 7/2003 | Breed et al. | 177/144 |
| 2005/0154503 A1 | 7/2005 | Jacobs | |

* cited by examiner

SYSTEM FOR DETECTING PERSONS IN A DEFINED SPACE

REFERENCE TO RELATED APPLICATIONS

The present application is the U.S. national phase of PCT International Patent Application No. PCT/FR2008/052309, filed Dec. 16, 2008, published on Jul. 2, 2009, as WO 2009/081018 A1 & A4, which claims the benefit of French Patent Application No. 0760143, filed Dec. 20, 2007, whose disclosures are hereby incorporated by reference in their entirety into the present disclosure.

FIELD OF THE INVENTION

This invention relates to a system for detecting the position of a mobile or immobile entity in a defined space generally representing a surface or specific volume.

More particularly, the system and object of this invention is intended for detecting the position of a person, a portion of the body of a person, or else an object, in a defined space.

Among numerous applications wherein the detection of a person in a defined spaces holds a certain interest, No-limiting reference may be made to the field of monitoring home-bound elderly people, with the identification of emergency situations occurring, the field of detecting intrusion into a premises, or else that of locating or following the path of persons within premises.

DESCRIPTION OF RELATED ART

Generally speaking, these applications are based on detecting the movement of the person and on reconnaissance of the activities of this person within the defined premises.

Thus, within the framework of an application specific to the remote monitoring of an elderly and/or ill person, U.S. Pat. No. 5,905,436 describes a monitoring system equipped with a programmable processor connected to a plurality of infrared motion sensors.

This device is intended to detect the activities of the person in one or more specific defined premises, such as a bedroom, bathroom, living room, etc. This devices stores signals relating to these detected activities in a table, and identifies emergency events such as the person falling down, so as to trigger an alarm on a display unit, in order to warn qualified personnel about these events.

The sensors are arranged in strategic locations so as to cover nearly all of each defined space. In particular, the system described in the aforesaid patent provides for at least one pair of sensors situated in the upper portion of a vertical plane defining the premises, at least one other pair of sensors situated in the lower portion of this vertical plane, and preferably at least one other sensor situated on a door in the space being monitored.

These sensors communicate with the processor in order to determine the activities of the monitored person. In particular, when the door sensor detects a movement of the door, the two pairs of sensors situated in the lower and upper portions of the vertical plane, respectively, will detect the movement of the person within the premises.

The situation in which a movement of the person is detected in the lower portion of the monitored premises while, at the same time, an absence of movement is detected in the lower portion, enables an alarm to be triggered in order to provide notification about the person's fall.

However, this device simply detects the presence and/or absence of movement of the person monitored, which is insufficient, in particular for detecting a person who is stationary, either voluntarily in order to escape detection (in the case of an intrusion), or involuntarily, due to a loss of consciousness, an ailment or any event immobilising the person on the ground.

Furthermore, this device is unsuitable for diagnosing false alarm situations due, in particular, to malfunctions of the device. Typically speaking, if the sensor monitoring the upper portion of the premises is defective or experiencing a breakdown, movement will be detected only in the lower portion, despite the presence of a standing person moving normally within the premises. This situation thus results in a false alarm being generated, since, in reality, no fall has occurred. Such being the case, the processing and elimination of false alarms is a major challenge in ensuring truly effective remote monitoring of elderly and/or ill persons.

In addition, the implementation of such a device is relatively complex, because it requires proper knowledge and identification of the activities of the person in each room in order to be applied to the entire residence of this person.

SUMMARY OF THE INVENTION

The objective of the invention is therefore to remedy at least one of these disadvantages by proposing a detection system the implementation of which is simple, and therefore easily integrable within the entire premises defined.

To that end, therefore, the invention relates to a system for detecting the position of a mobile or immobile entity in a defined space, characterised in that it includes:
  means of detecting the presence of said entity in at least two partially overlapping observation areas of said space, said means being adapted for collecting at least one piece of immobile presence information and/or one piece of movement information of said entity in each of said observation areas,
  processing means, which are adapted for carrying out logic operations on at least a portion of said information collected for each of said observation areas,
  decision means, which are connected to processing means and adapted for controlling an action on the basis of a logic signal generated by the processing means.
The presence detection means preferably include:
  a device for transmitting/receiving signals, which is specific to each observation area, including at least one transmitting element for transmitting signals in the observation area associated with at least one receiving element for picking up an instantaneous echo consisting of the reflected signals coming from said observation area,
  means of storing a reference echo for each observation area, which is representative of reflected signals coming from each of said areas in the absence of said entity,
  means of comparing said instantaneous echo and said reference echo for each observation area, which are suitable for producing said presence and/or movement information of said entity in said observation area.

The transmitting/receiving device preferably includes a radiofrequency transmitter/receiver circuit including a radiofrequency signal generator coupled with at least one antenna system forming the transmitting element for transmitting the signals to at least one radiofrequency sensor forming the receiving element, which is connected to an analogue/digital converter by means of an amplifier and a low-frequency filter.

The comparison means are advantageously suitable for carrying out a subtraction operation between the amplitude or the phase, or the amplitude and the phase of said echoes.

According to first embodiment, a first observation area corresponds to the total volume of said space and a second observation area is contained in a second volume of said space, which is defined by walls of said space and situated between substantially horizontal planes.

Said substantially horizontal planes are advantageously arranged at approximately 0.8 m and 1.5 m, respectively, from the floor of said space.

According to a second embodiment, a first observation area includes a volume situated between two vertical planes perpendicular to a first direction, and a second observation area includes a volume situated between two horizontal planes parallel to the first direction, and a third observation area includes a volume situated between two vertical planes parallel to the first direction.

According to a third embodiment, the detection system includes a plurality of observation areas divided into first and second transverse series of successive volumes of said space, each of said volumes of said first and second series of volumes being defined by walls of said space and situated between substantially vertical planes.

The invention likewise relates to an application of a detection system according to the first embodiment to the identification of an emergency situation in a premises forming said space for monitoring a person at home.

The invention also relates to an application of a detection system according to the second embodiment to the prevention of an untimely triggering of an airbag present in the passenger compartment of a motor vehicle travelling on a road oriented in the first direction.

The invention also relates to another an application of a detection system according to the third embodiment to the precise locating of an entity in a premises forming said space.

The invention also relates to a method for detecting a mobile or immobile entity in a defined spaced, characterised in that it includes the following steps consisting of:

detecting the presence of said entity in at least two partially overlapping observation areas of said space, so as to collect at least one piece of presence information and/or one piece of movement information of said entity in each of said observation areas;

carrying out logic operations on at least a portion of said collected information, so as to generate a logic result signal;

analysing said logic signal so as to control an action on the basis of said result.

For each observation area in question, the presence detection step advantageously includes:

the measurement and storage of a reference echo representative of reflected signals in said area in the absence of said entity;

the measurement of an instantaneous echo consisting of the reflected signals coming from said observation area;

the comparison between the instantaneous echo and the reference echo for said area, so as to generate said presence and/or movement information of said entity in said observation area.

The comparison step between the instantaneous echo and the reference echo is advantageously carried out by a subtraction operation between the amplitude, or the phase, or the amplitude and the phase of said echoes.

According to one embodiment, the measurement of the reference echo representative of the reflected signals in said area in the absence of said entity is carried out when the space is empty.

According to an alternative, the measurement of the reference echo representative of the reflected signals in said area in the absence of said entity is the result of a processing operation applied to a plurality of instantaneous echoes picked up in the presence of said mobile entity in said space.

BRIEF DESCRIPTION OF THE DRAWINGS

Other characteristics and advantages of this invention will become more apparent upon reading the following description given for illustrative and No-limiting purposes, and with reference to the appended figures, in which.

DETAILED DESCRIPTION OF THE PREFERRED EMBODIMENTS

Figure 1:
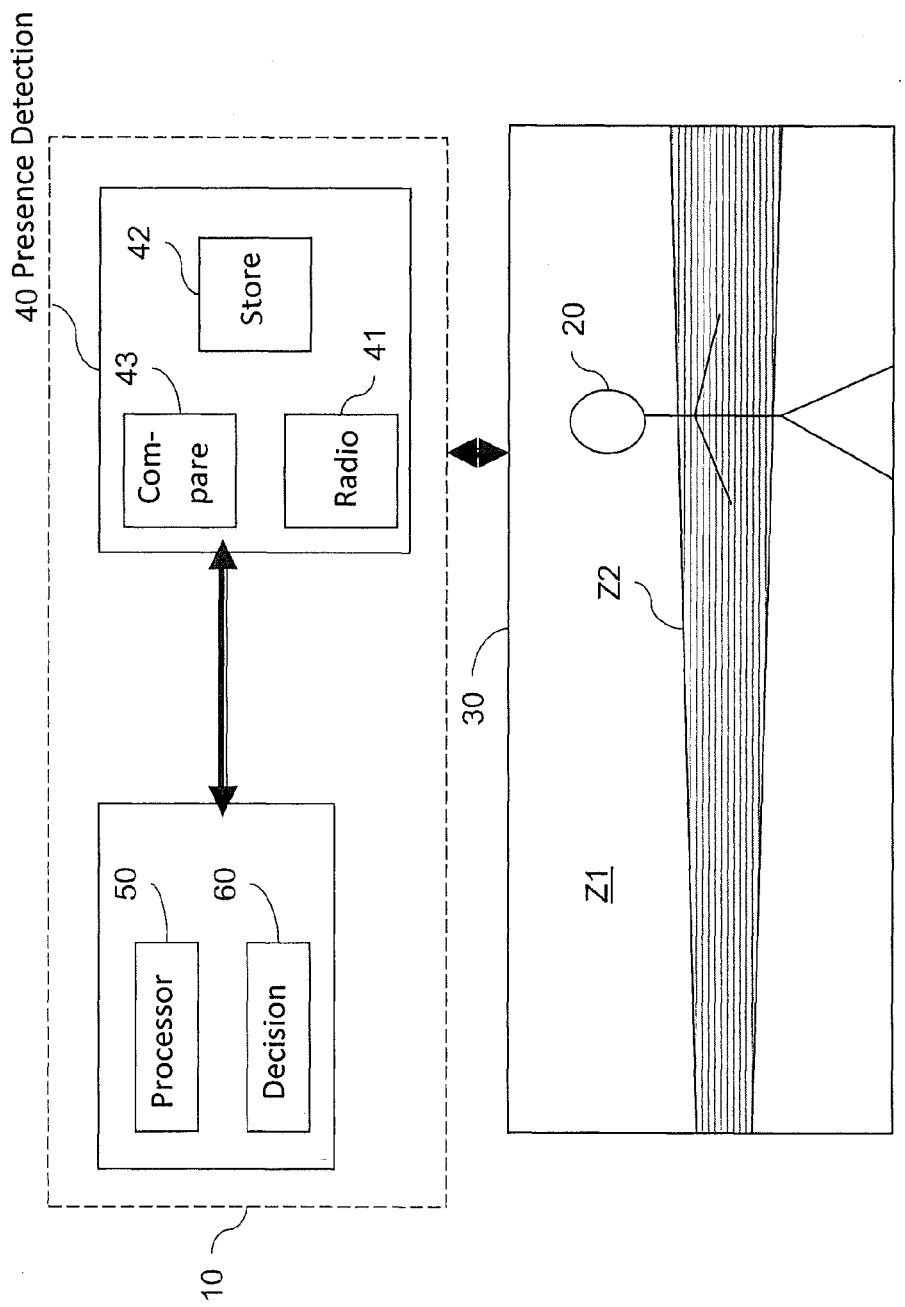
FIG. 1 is a schematic representation of a detection system according to the invention.

A system for detecting 10 an entity, in this case a person, in a defined premises 30 is described with reference to FIG. 1.

Such a system includes presence detection means 40 of a person in at least two observation areas of the premises, A1 and Z2, respectively, which are chosen so as to overlap at least partially. In the example of FIG. 1, the observation area Z1 consists of the entire volume of the premises, and the observation area Z2 consists of a "slice" of this volume, which is defined by two substantially horizontal planes. As will be seen in greater detail hereinbelow, in support of specific examples, the choice of the observation areas of FIG. 1 is given for purely illustrative purposes and in reality depends on the type of application for which the detection system is intended. However, one common characteristic shared by the detection system according to the invention, irrespective of the application for which it is intended, is based on the use of at least two partially overlapping (or No-separated) observation areas.

Presence detection means are understood to mean means suitable for detecting both a moving as well as stationary entity. The composition of such means will be discussed in greater detail later on.

The information collected by the presence detection means for each of the observation areas of the premises involved, namely presence information and/or movement information of the person in each of these areas, are then provided to processing means 50 suitable for carrying out logic operations on this information and about which greater detail will likewise be provided later on, with reference to the specific examples provided.

The system according to the invention further includes decision means 60 connected to the processing means 50, which, based on the logic signal generated by same, will enable a specific pre-established action to be controlled, such as triggering an alarm, for example.

One of the essential elements of the detection system according to the invention is therefore the use of No-separated observation areas, which is associated with the use of presence detection means in each of them, which are capable of detecting a person, even if stationary, within each area. It is then the match between the presence information, as determined by the processing means, optionally combined with movement information collected for each of the No-separated observation areas, with that of the logic table that was pre-established according to the intended application, which enables a specific action to be triggered.

Returning now in greater detail to the invention, the presence detection means 40 are preferably based on the use of the sectoral or directional wave radiation, as well as on the reflection of waves on the person, objects and walls of the premises, in order to establish the presence and the location of the person, a portion of the person, or object, even if stationary within a premises.

Various wave types can be used for this purpose, insofar as it involves waves capable of propagating, of being reflected, and insofar as the amplitude and phase thereof can be measured. The detection means, for example, can be based on the use of electromagnetic waves, e.g., of the radioelectric, infrared or optical type, else on the use of acoustic waves.

An embodiment of the detection means will be described more particularly with reference to the use of electromagnetic radiofrequency waves.

Thus, according to this embodiment, the detection means 40 include a device 41 for transmitting/receiving radiofrequency signals, which is specific to each observation area involved, which uses the principle of radiating and reflecting electromagnetic frequency waves on various objects possibly present in the associated observation area, as well as on a person present in this area.

A signal transmitting/receiving device 41 id designed using various commercially available radiofrequency components for various short-range telecommunication applications and, in particular, industrial scientific and medical and/or short-range applications also known as ISM/SRD (for Industrial Scientific Medical/Short-Range Devices).

The signal transmitting/receiving device 41 is conventionally based on a homodyne structure known per se. An example of the radiofrequency components present in such a homodyne circuit is provided with reference to FIG. 2.

It is well understood that other types of structures for the transmitting/receiving device 41 can be used without departing from the scope of the invention.

Figure 2:
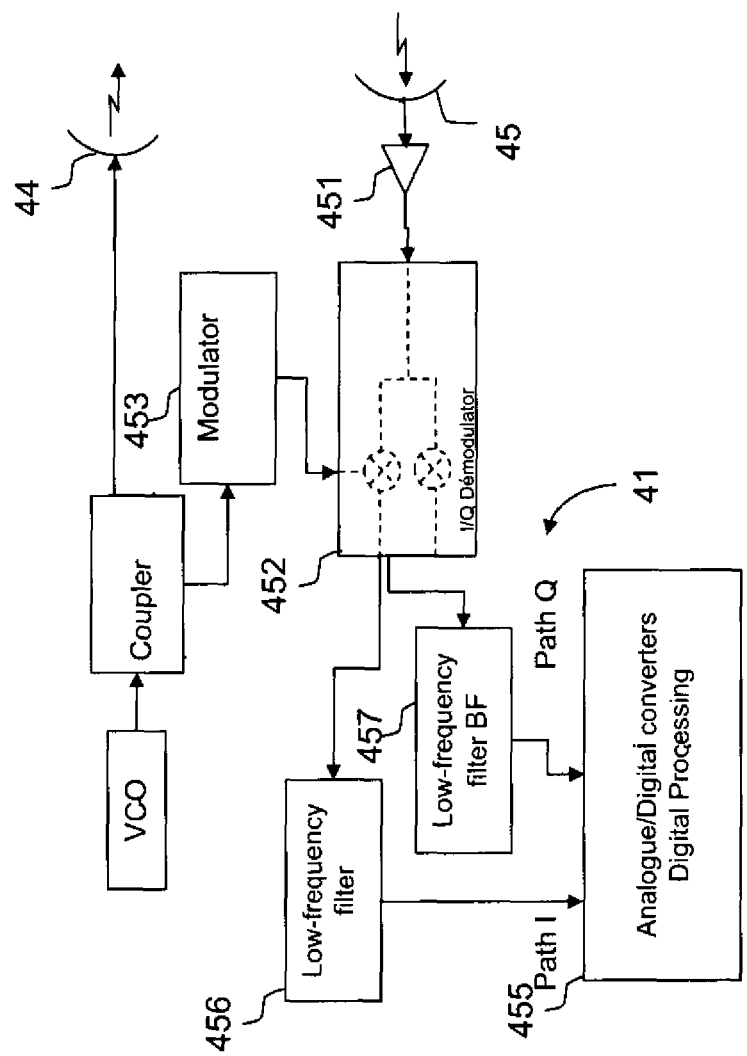
FIG. 2 is a schematic representation of an exemplary embodiment of a transmitting/receiving device included in the system of the invention.

The transmitting/receiving device 41 of FIG. 2 consists in particular of one or more transmitting elements 44 capable of transmitting signals in the associated observation area and one or more receiving elements 45 capable of picking up reflected signals coming from this observation area.

The transmitting element 44 of the device 41 consists of one or more antenna systems radiating successively or simultaneously in the associated observation area and capable of being positioned at predefined locations in the observation area. These antenna systems, for example, can consist of radiating or slotted coaxial cables or a wired antenna.

The receiving element 45 of the device 41 can consist of one or more radiofrequency sensors distributed in the associated observation area and picking up the signals from this area which are reflected.

The echo picked up is transmitted by means of a high-gain and low-noise amplifier 451 to a demodulation circuit 452 for extracting a modulating signal derived from the modulator 453 of the carrier wave and for recovering, at the output, the orthogonal components I and Q of the signal, which are each transmitted to an analogue/digital converter 455, by means of an amplifying and low-frequency filtering unit, 456 and 457, respectively.

An analogue/digital converter 455 is then capable of converting the analogue signals collected into digital data, so as to carry out digital processing operations on this data. In particular, the objective of these processing operations is to measure either amplitude variations or phase variations, or amplitude and phase variations, which are induced by the presence, even if stationary, of the person in the beam of the antennas.

In order to determine this variation, the detection means 40 include storage means 42 adapted for storing a reference echo for each observation area involved, which, for example, is measured during an initialisation phase of the system and optionally updated periodically, said reference echo being representative of the reflected signals coming from the area in question in the absence of the person.

As a matter of fact, the presence detection principle is based on a variation of the echo picked up at a moment t for the observation area in question, hereinafter referred to as the instantaneous echo, in relation to the one reflected by said area in the absence of the person, which is referred to as the reference echo.

The periodic updating of this reference echo further enables account to be taken, on a regular basis, of the possible modifications made in this echo by physical modifications of the content of the observation area in question, which, for example, are related to any addition, deletion or movement of furnishings in the area in question.

The measurement of the reference echoes for each observation area may be carried out in several ways, according to one or any combination of the methods described below.

According to a first embodiment, for an observation area in question, the detection device measures the amplitude, or phase or else the amplitude and phase of the signal reflected by said area, either upon start-up of the device in a premises deemed to be empty, or each time that information external to the device indicates thereto that the premises is empty. The reference echo thus obtained for each observation area is stored in the storage means of the device provided for this purpose.

According to another embodiment, the measurement of the reference echo for a given observation area, which is representative of the reflected signals in said area in the absence of the person, is the result of a processing operation applied to a plurality of instantaneous echoes picked up in the presence of the person moving within the premises.

More precisely, in the case of devices capable of measuring exclusively the amplitude of the reflected signal, one method consists in estimating the reference echo by successive measurement sequences of the signal received in the presence of the person moving within the presence (instantaneous echo) and by calculating the mean value of the amplitude of these signals, this mean value then being adopted as the reference value.

An alternative suited to the case of detection devices capable of measuring the amplitude and the phase of the reflected signal, consists in estimating the reference echo by successive measurement sequences of the signal received in the presence of the person moving within the premises (instantaneous echo) by calculating the mean value of the complex signal measured during phases of rapid and strong variations in the signal, corresponding to movements of the person in the room.

These two methods are based on the fact that the movements of the person in the premises make it possible to separate the portion of the null Doppler signal produced by the reflection of the premises from the portion of the No-null Doppler signal produced by the movement of the person in the premises.

After measuring the reference echo for a given observation area and measuring the instantaneous echo for this same area, the detection means are capable of processing this collected data via each antenna pair 44/45 associated with each observation area. In order to accomplish this, the detection means include means of comparing 43 the instantaneous echo and the referenced echo picked up for each observation area, thereby enabling a piece of presence information to be produced as output and/or, depending on circumstances, a piece of movement information of the person in each of the observation areas of the premises in question. These comparison means are typically implemented by a computer, the principle processing steps of which will be described in greater detail below, with reference to the application examples provided.

The invention will now be described within the framework of a specific application relating to the detection of emergency situations, characterised by a fall, an ailment or a loss of consciousness immobilising a person on the floor in a premises.

Figure 3:
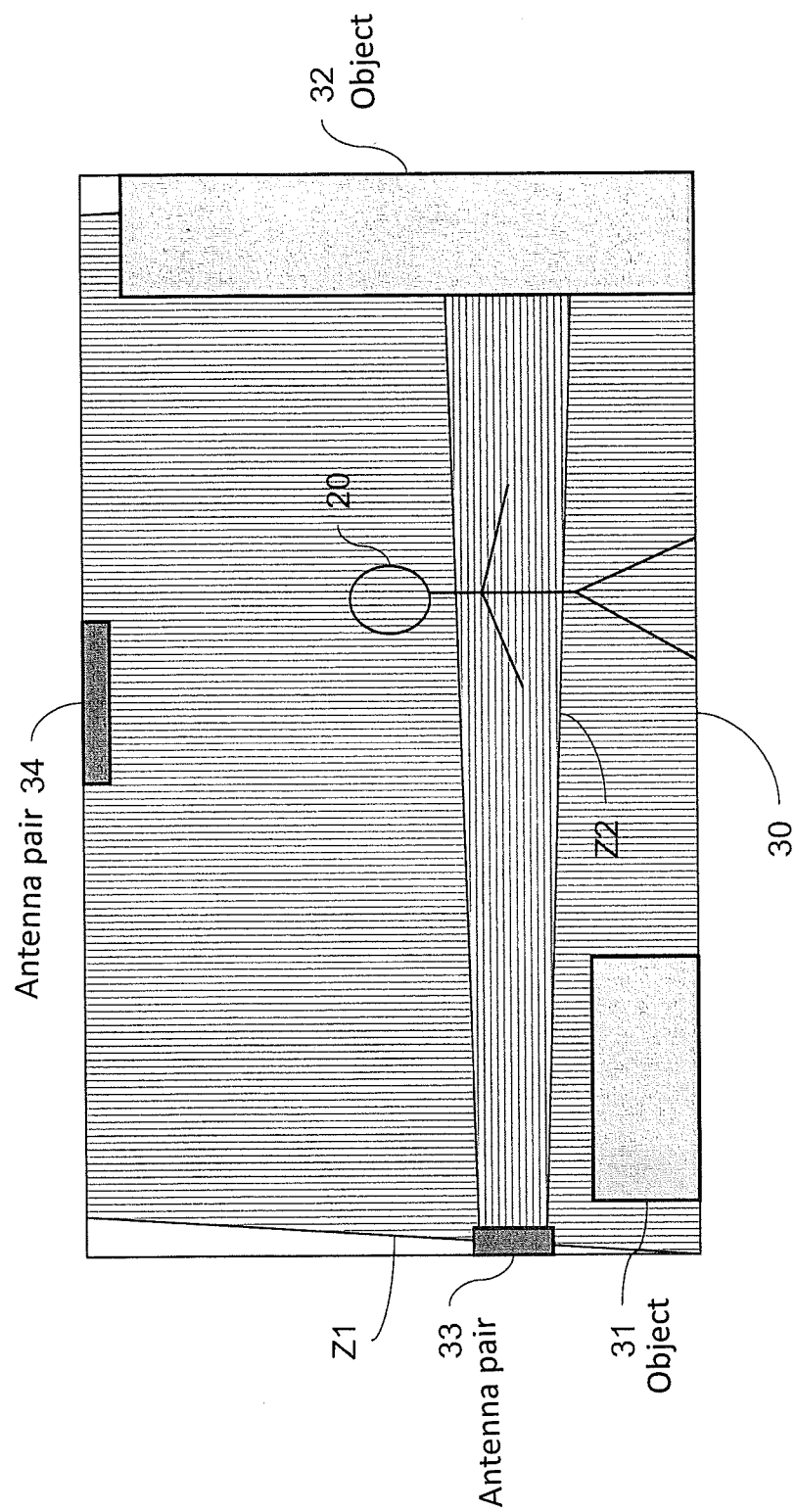
FIG. 3 is a schematic illustration of a first specific application of the system according to the invention to the locating of mobile and/or immobile persons on the floor and to the identification of emergency situations.

For illustrative purposes, FIG. 3 shows an environment of the person 20 being monitored comprising a defined space 30 consisting of a premises equipped with the detection system of the invention as just described, and in which objects 31, 32 are present which, for example, consist of furnishings (furniture, lighting fixtures or others).

A first observation area Z1 (area 1) shown in FIG. 3 is defined substantially by the entire premises.

A transmitting/receiving device is therefore associated with this first observation area Z1 for the purpose of observing the entire premises and of enabling the presence of a person to be detected throughout the premises. To accomplish this, a first pair of antennas 34 is used as transmitting and receiving elements advantageously having a very wide radiation pattern (at least a 90° opening in each plane). For example, they may consist of dipolar-type antennas in the case where radiofrequency waves are used. They may be arranged either on the ceiling of the premises, aiming downward at the entire premises (at least an 120° opening in each plane), as shown in the example of FIG. 3, or, according to an alternative, in proximity to a wall/ceiling connection (at least a 90° opening in each plane).

A second observation area Z2 (area 2) partially overlapping the first observation area Z1 is defined by a volume of the premises which is defined by the walls thereof and situated between two horizontal planes, which are preferably positioned at approximately 0.8 m and 1.5 m, respectively, from the floor of the premises.

A transmitting/receiving device is therefore associated with this second observation area Z2 for the purpose of observing this area in particular and of enabling the presence of a person to be detected therein. To accomplish this, a second pair of antennas 33 is used as transmitting and receiving elements advantageously having a wide radiation pattern (90° to 180° opening in a plane perpendicular to the axis of the antennas). This antenna pair, which is associated with the observation area Z2, may, for example, consist of either a pair of slotted coaxial cables or a pair of slotted antennas. It may be arranged either in the middle of one of the walls of the premises or in a corner of the room. In both cases, these antennas will be positioned preferably at an average height of approximately 1.20 m.

In this particular application, measurement of the reference echo in each area Z1 and Z2 will be carried out first of all upon start-up of the device, during an initialisation phase triggered by the installer. Next, the reference echoes will be measured for updating purposes, according to the principles already set forth previously.

Each transmitting/receiving device is intended for measuring, at regular intervals, e.g., every 30 seconds or every minute, the amplitude, or the phase, or else the amplitude and the phase of the reflected signal coming from the associated observation area, thereby forming the instantaneous echo.

Figure 4:
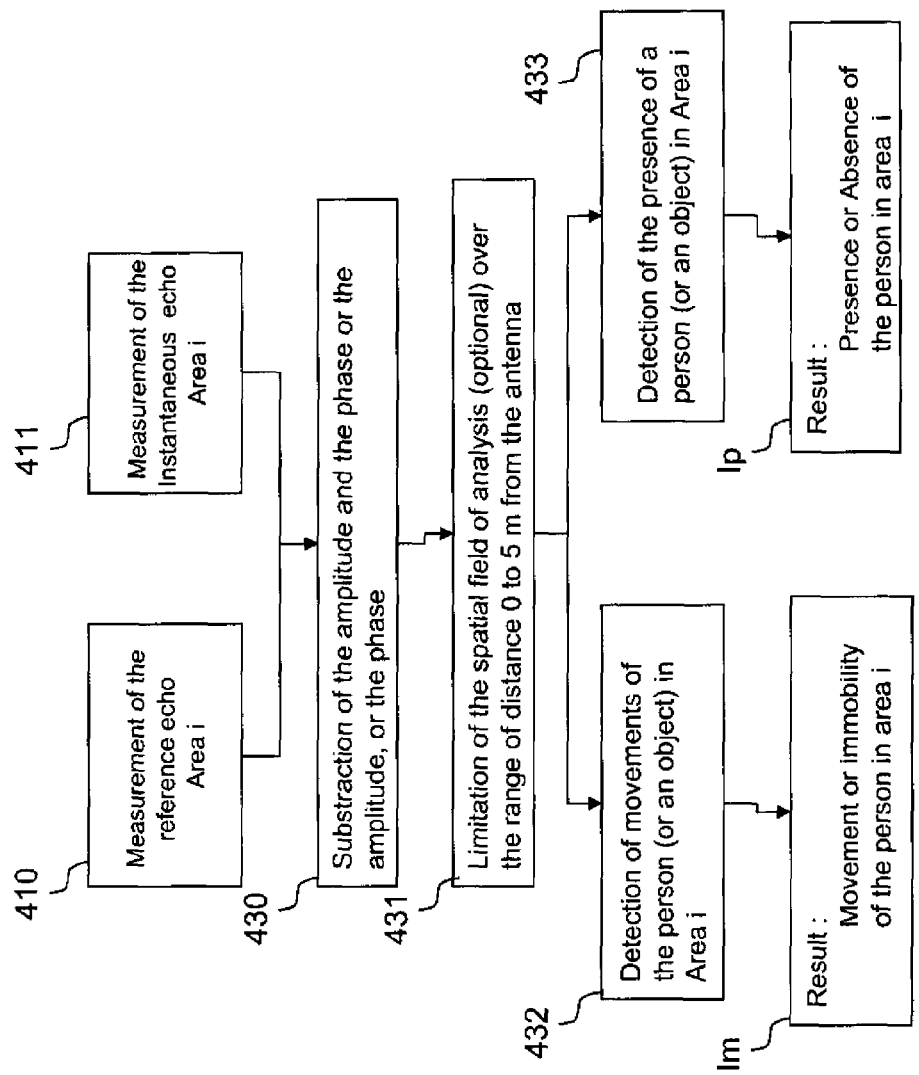
FIG. 4 is a flowchart showing the principal processing steps carried out by detection means of the system according to the invention, in each observation area, within the framework of this first application.

FIG. 4 then shows the principle processing steps carried out by the computer on the data collected by each transmitting/receiving device associated with each observation area i.

Thus, having a measurement 410 of the reference echo for the area I and a measurement 411 of an instantaneous for this area I, a processing step 430 is carried out, which consists in comparing these echoes for the area i in question. This comparison between the reference echo and the instantaneous echo can consist in carrying out a subtraction operation between the amplitude, or the phase, or the amplitude and phase of said echoes, depending on the type of measurement carried out in order to obtain the echoes.

A step 431 limiting the spatial area of analysis is optionally implemented over the range of distance of between 0 and 5 m from the antenna, the maximum detection distance in this particular application being extended to approximately 5 m.

A step 433 of analysing the subtracted echo derived from the comparison between the reference echo and the instantaneous echo enables information to be obtained about the presence or No-presence (absence) of a person in the area i in question. As a matter of fact, the presence of a mobile or immobile person in the area of observation i in question modifies the subtracted echo, thereby enabling a detection operation to be initiated, in order to provide, as output, the presence information Ip of the person in the area i in question.

A step 432 of analysing the subtracted echo can further be implemented so as to obtain information about the movement or absence of movement (immobility) of the person in the area i in question. As a matter of fact, the presence of a phase or amplitude modulation of the subtracted echo at frequencies of a few Hertz makes it possible to detect the existence of movement of the person present in the area i in question (by applying the Doppler effect). The movement information Im of the person in the area i in question is thereby obtained as output.

The processing operation just described with respect to the data collected by each transmitting/receiving device associated with each observation area therefore enables detection of both the presence or absence of an entity and the possible movement of this entity in each of the areas. It is further possible to anticipate the possibility of determining a minimum Doppler frequency threshold below which it will be considered that a detected person is no longer moving sufficiently to be considered conscious, thereby possibly triggering an early warning after a latency time of a few minutes.

Figure 5:
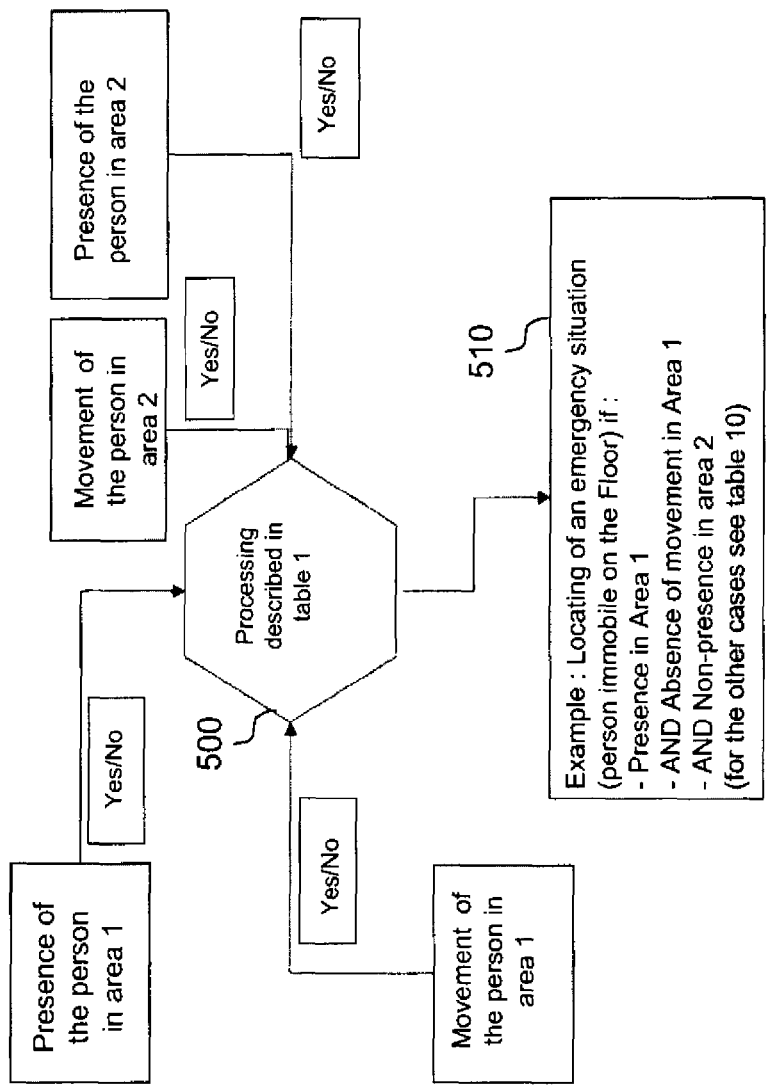
FIG. 5 is a flowchart showing the processing steps carried out on the information collected by the detection means for each of the observation areas, within the framework of the first application.

The presence and movement information collected in each of the observation areas Z1 and Z2 is then submitted to the processing means 50 in order to be merged by means of the logic operations carried out on same. To that end, FIG. 5 shows a processing operation 500 carried out by the processing means on the presence and movement information of the person in each of the two observation areas Z1 and Z2, with a view to determining an action to be undertaken on the basis of the execution result of the logic operations.

To illustrate, a step of analysing 510 the merging of all of the information collected for each of the observation areas can result in identifying an emergency situation if the resulting signal of the merging of the presence and movement information satisfies the following rule:

Presence in area 1
AND absence of movement in area 1
AND No-presence in area 2

Such a result actually signifies that the person is immobile on the floor, then resulting in the command by the decision means for a specific action possibly consisting, for example, in triggering an alert to a remote emergency centre.

Table 1 below lists all of the situations capable of being identified by merging the presence and movement information derived from the two observation areas Z1 and Z2.

This table, which is in the form of a truth table, includes a first output relating to conclusions issued on the basis of each of the possible combinations of values for the operands which, in this case, are the presence and movement information collected in the observation areas Z1 and Z2 of the premises, respectively. A second output determines actions capable of been undertaken, which are associated with these conclusions.

The binary states 0 and 1 represent No-detection and detection, respectively.

| Case No. (binary code) | Z1 Presence | Z1 Movement | Z2 Presence | Z2 Movement | Conclusion | Action |
|---|---|---|---|---|---|---|
| 0 (0000) | No | No | No | No | No person is present in the room | Possibility of measuring the reference echoes of areas Z1 and Z2 |
| 1 (0001) | No | No | No | Yes | Malfunctioning of the detection means in area Z1. The person is moving in area Z2, and is therefore standing or sitting. | Transmit the breakdown information about the detection means in area Z1. |
| 2 (0010) | No | No | Yes | No | Malfunctioning of the detection means in area Z1. The person is present and immobile in area Z2, and is therefore standing or sitting. | Transmit the breakdown information about the detection means in area Z1. |
| 3 (0011) | No | No | Yes | Yes | Malfunctioning of the detection means in area Z1. The person is present and moving in area Z2, and is therefore standing or sitting. | Transmit the breakdown information about the detection means in area Z1. |

-continued

| Case No. (binary code) | Z1 Presence | Z1 Movement | Z2 Presence | Z2 Movement | Conclusion | Action |
| --- | --- | --- | --- | --- | --- | --- |
| 4 (0100) | No | Yes | No | No | The person is detected as moving in area Z1 but not present in area Z2. The person is therefore lying down or bending down. They are moving. | Possible recording of the date and time of the start of this situation. Possible increase in the frequency of observation. |
| 5 (0101) | No | Yes | No | Yes | The person is detected as moving in areas Z1 and Z2. | None |
| 6 (0110) | No | Yes | Yes | No | The person is detected as moving in area Z1 and present in area Z2 without moving. They are standing or sitting, moving their legs but not the upper portion of their body. | None |
| 7 (0111) | No | Yes | Yes | Yes | The person is detected as moving in areas Z1 and Z2. | None |
| 8 (1000) | Yes | No | No | No | The person is present, lying down on the floor and immobile. Identification of an emergency situation. | Triggering of an early warning after x minutes. |
| 9 (1001) | Yes | No | No | Yes | The person is detected as present in area Z1 and as moving in area Z2, without any movement being detected in area Z1. | Transmit the breakdown information about the detection means in area Z1 with regard to the movement detection function thereof. |
| 10 (1010) | Yes | No | Yes | No | The person is standing or sitting and immobile. | None |

-continued

| Case No. (binary code) | Z1 Presence | Z1 Movement | Z2 Presence | Z2 Movement | Conclusion | Action |
|---|---|---|---|---|---|---|
| 11 (1011) | Yes | No | Yes | Yes | The person is detected as present in area Z1 and as moving in area Z2, without any moving being detected in area Z1. | Transmit the breakdown information about the detection means in area Z1 with regard to the movement detection function thereof. |
| 12 (1100) | Yes | Yes | No | No | The person is therefore lying down or bending down. They are moving. | Possible recording of the date and time of the start of this situation. Possible increase in the frequency of observation. |
| 13 (1101) | Yes | Yes | No | Yes | The person is detected as moving in area Z1 and in area Z2. | None |
| 14 (1110) | Yes | Yes | Yes | No | The person is standing or sitting and is moving only their lower limbs. | None |
| 15 (1111) | Yes | Yes | Yes | Yes | The person is present (standing or sitting) and moving. | None |

As concerns case nos. 1, 4, 5, 6, 7, 9 and 13, it can be noted that it is possible for the movement of a person to be detected in an area Zi, without the presence of this person being detected in this same area Zi. This case corresponds to the fact that the temporal average over the amplitude, or over the amplitude and the phase of the signals created by the movement can occasionally be equal to the amplitude, or the amplitude and the phase of the reference echo, respectively, and therefore not trigger presence detection per se. In this case, the choice is made to conclude that there is a presence and movement in area Zi.

The following cases correspond to the cases of interest:
Case No. 0: the person is absent from the premises; this case enables optional triggering of a measurement of the reference echoes of areas Z1 and Z2.
Case Nos. 10, 14, 15: the person is present, mobile or immobile in the upper portion of the premises. These cases correspond to a safety situation for the person.
Case No. 8: the person is immobile in the lower portion of the premises. This case requires the triggering of an early warning after a few minutes, e.g., 1 to 5 minutes, in order to prevent unnecessary triggering in the case where the person manages to get up again by themselves.
Case Nos. 4 and 12: the person is on the floor but moving. If rate of variation in the signal picked up is rapid, it may be a case, for example, of a person performing gymnastic movements on the floor. No alert will then be triggered as long as the person's movements on the floor are fast enough.

The detection system according to the invention therefore enables a high degree of refinement to be obtained in the various identifiable situations.

Furthermore, owing to the use of partially overlapping observation areas (i.e., non-separated) as well as to the cross-referencing between the presence/absence and movement/immobility information collected in each of them, the detection system according to the invention advantageously has a self-diagnostic function, thereby enabling identification and processing of breakdowns and malfunctions.

Thus, case Nos. 1 to 3, 9 and 11 typically correspond to such events, because the cross-referencing between the information collected for each area Z1 and Z2 corresponds to a physical impossibility. For example, for cases 1 to 3, a presence and/or a movement is detected in area Z2, whereas no presence or movement is detected in area Z1, therefore clearly indicating a malfunction.

This complete processing resulting in the identification of situations involving breakdowns or malfunctions thus makes it possible to considerably limit the triggering of false alarms, which otherwise adversely affect the interests and efficiency of such systems.

Another application of the system according to the invention will now be described within the framework of prevention and passive safety in the automotive industry.

This other specific application relates to management of a safety device such as an inflatable safety airbag, more commonly called an airbag, inside a motor vehicle passenger compartment.

A motor vehicle normally includes a driver's seat and a front passenger seat. It likewise includes at least one airbag provided for each seat so as to protect the users of the vehicle during a collision and thereby prevent them from violently crashing into certain equipment of the vehicle.

One is concerned more particularly with front airbags. They are housed at various locations in the vehicle depending on use, e.g., on a steering wheel for the driver and inside a dashboard for the front passenger.

Triggering of the front airbag during an impact can cause lesions or injuries, or even death, in particular if the user is in an unusual position, e.g., with their head bent down in order to pick up an object that has fallen to the floor or in the case where the driver is very close to the steering wheel.

It is therefore particularly critical to be capable of detecting the nominal position of the user's head prior to triggering the airbag. The objective is to ensure that the user's head is in a position allowing the airbag to be triggered without endangering the user, prior to actually triggering the airbag. This detection should be carried out at a frequency preferably of the order of one second.

Figure 6:
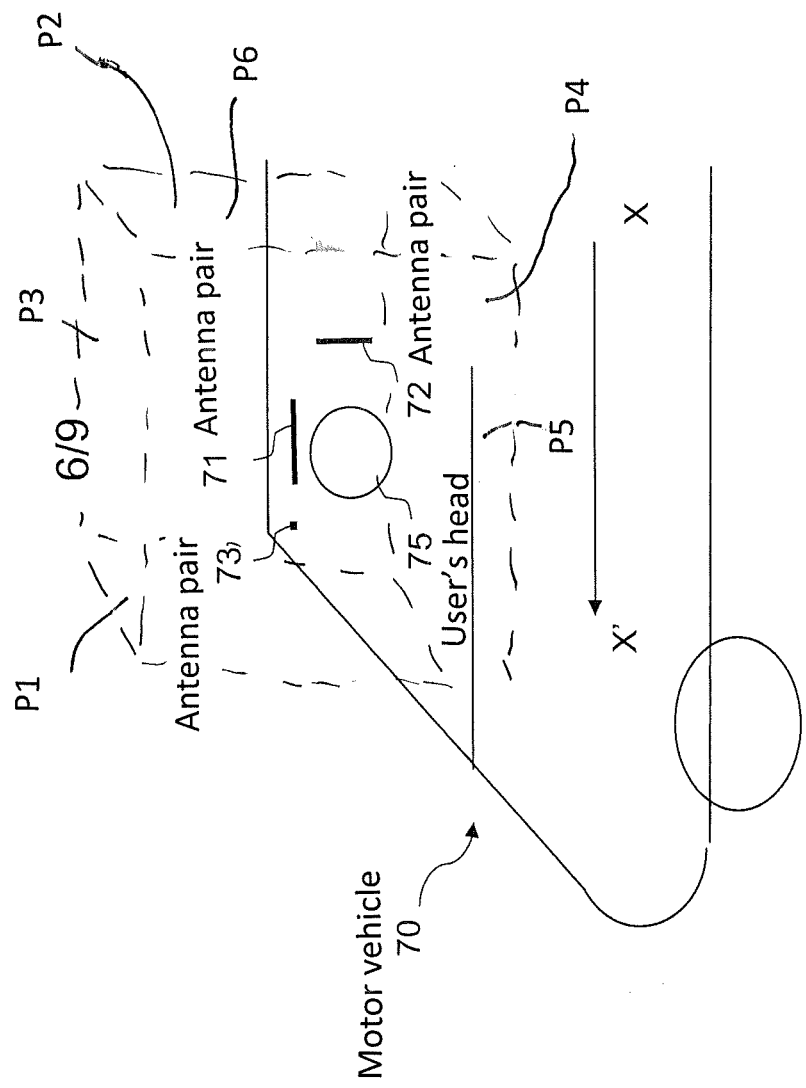
FIG. 6 is a schematic illustration of a second specific application of the system according to the invention to the management of safety devices in a motor vehicle passenger compartment.

An example of this application is shown in FIG. 6, in which a motor vehicle 70 is shown schematically as a side view.

This application requires the definition of three non-separated observation areas.

Thus, a first observation area, known as area 1, of the defined premises, includes a volume situated between two vertical planes P1, P2 perpendicular to a direction XX' symbolising the forward-moving direction of the vehicle on the road.

A transmitting/receiving device associated with this first observation area includes a first pair of antennas 71 making it possible to monitor the particular volume consisting of this first observation area. The pair of antennas may consist of either a pair of slotted coaxial cables, or a pair of slotted-guide type antennas, or a pair of wired antennas. These types of antennas are intended to radiate, within the immediate proximity thereof (a few antenna lengths), a field that is spatially limited to the physical length thereof, in all the planes containing the axis thereof. According to the exemplary embodiment of FIG. 6, the first pair of antennas 71 may advantageously be positioned in the roof of the vehicle 70 horizontal and parallel to the axis XX', in order to monitor the volume consisting of the first observation area.

A second predetermined observation area of the defined premises consisting of the motor vehicle passenger compartment, known as area 2, includes a volume situated between two horizontal planes P3, P4 parallel to the direction XX'.

Finally, a third predetermined observation area of the premises consisting of the motor vehicle passenger compartment, known as area 3, includes a volume situated between two vertical planes P5, P6 parallel to the direction XX'.

Finally, a third predetermined observation area of the premises consisting of the motor vehicle passenger compartment, known as area 3, includes a volume situated between two vertical planes parallel to the direction XX'.

A transmitting/receiving device associated with this third observation area includes a third pair of antennas 73 likewise having the aforesaid characteristics and making it possible to monitor the particular volume consisting of this third observation area. This third pair of antennas, for example, may be positioned at the junction between the windshield and the roof of the vehicle, transversely in relation to the direction XX'.

Each pair of antennas therefore monitors an observation area specific thereto, which is defined by a particular volume of the passenger compartment of the vehicle.

The user's head 75 must be located within these three observation areas simultaneously in order to allow the airbag to be triggered if needed, otherwise the airbag is not triggered.

In this particular application, the measurement of the reference echo in each area will be carried out either during the operation of unlocking the doors of the vehicle, before the driver has entered the vehicle, or periodically during the period of non-use of the vehicle.

In the same way as for the preceding application example, each transmitting/receiving device is intended to measure, at regular intervals, the amplitude, or the phase, or else the amplitude and the phase of the reflected signal coming from the associated observation area, thereby forming the instantaneous echo.

Figure 7:
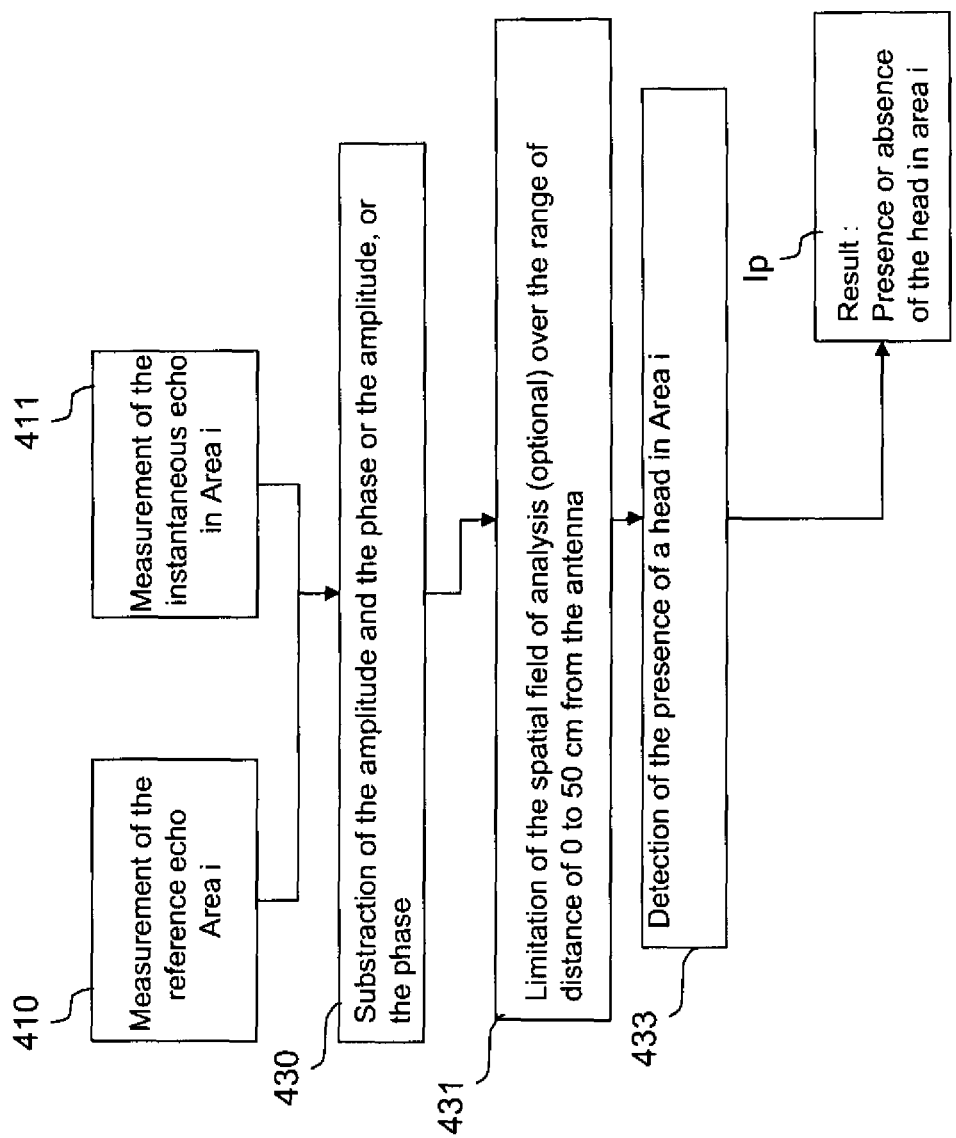
FIG. 7 is a flowchart showing the principle processing steps carried out by detection means of the system according to the invention, in each observation area, within the framework of this second application.

FIG. 7 thus shows the principle processing steps carried out by the computer on the data collected by each transmitting/receiving device associated with each observation area i. The same steps as those already described with reference to FIG. 4 are implemented, with the only difference being that, according to this application, the detection means built into the motor vehicle are designed to collect solely presence/absence information Ip about the head in each of the three observation areas in question, the movement information not being necessary.

Figure 8:
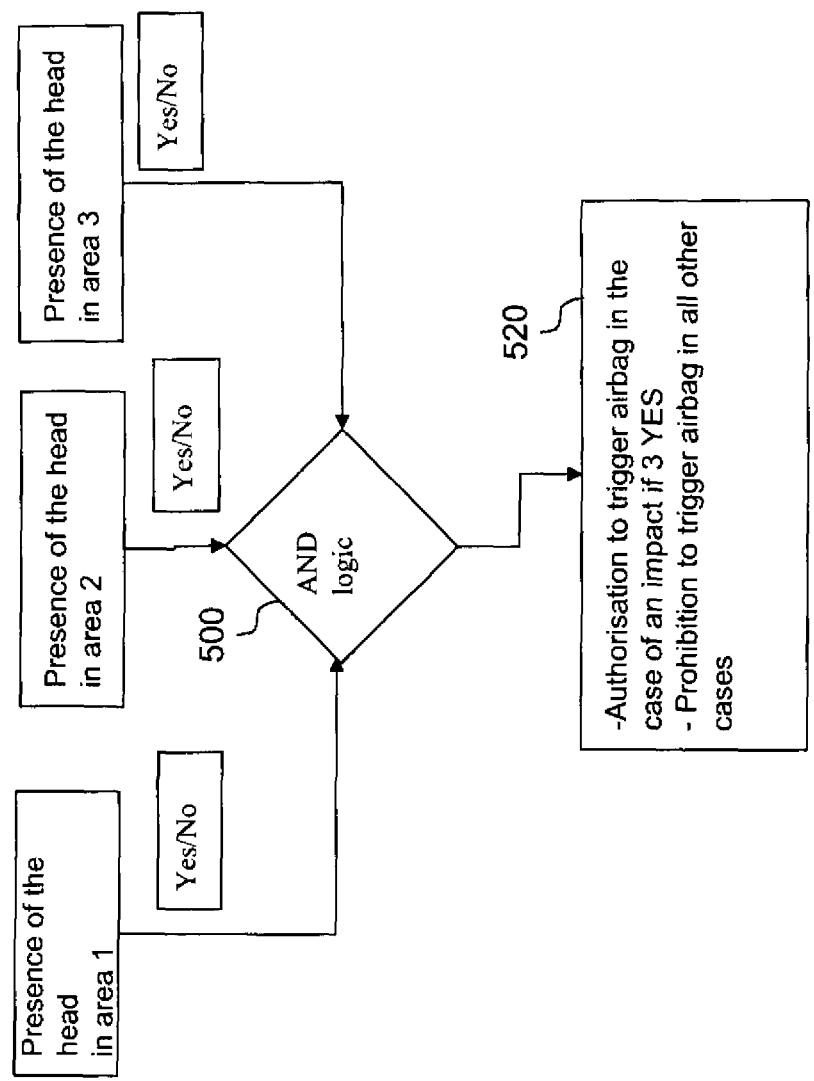
FIG. 8 is a flowchart showing the processing steps carried out on the information collected by the detection means for each of the observation areas, within the framework of this second application.

The presence/absence information about the head, which is collected in each of the three observation areas, is then submitted to the processing means 50 in order to be merged in step 500, thereby implementing the AND logic operation as shown in FIG. 8, with a view to allowing or prohibiting the airbag to be triggered.

Thus, a step of analysing 520 the merging of this information results in allowing the airbag to be triggered only if the signal resulting from the merging of the head presence information in each of the areas satisfies the following rule:

Presence in area 1
AND presence in area 2
AND presence in area 3.

In all of the other hypothetical situations, triggering of the airbag is prohibited.

Finally, according to another example, the detection system of the invention can be applied to locating and tracking the path of persons in a premises.

Figure 9:
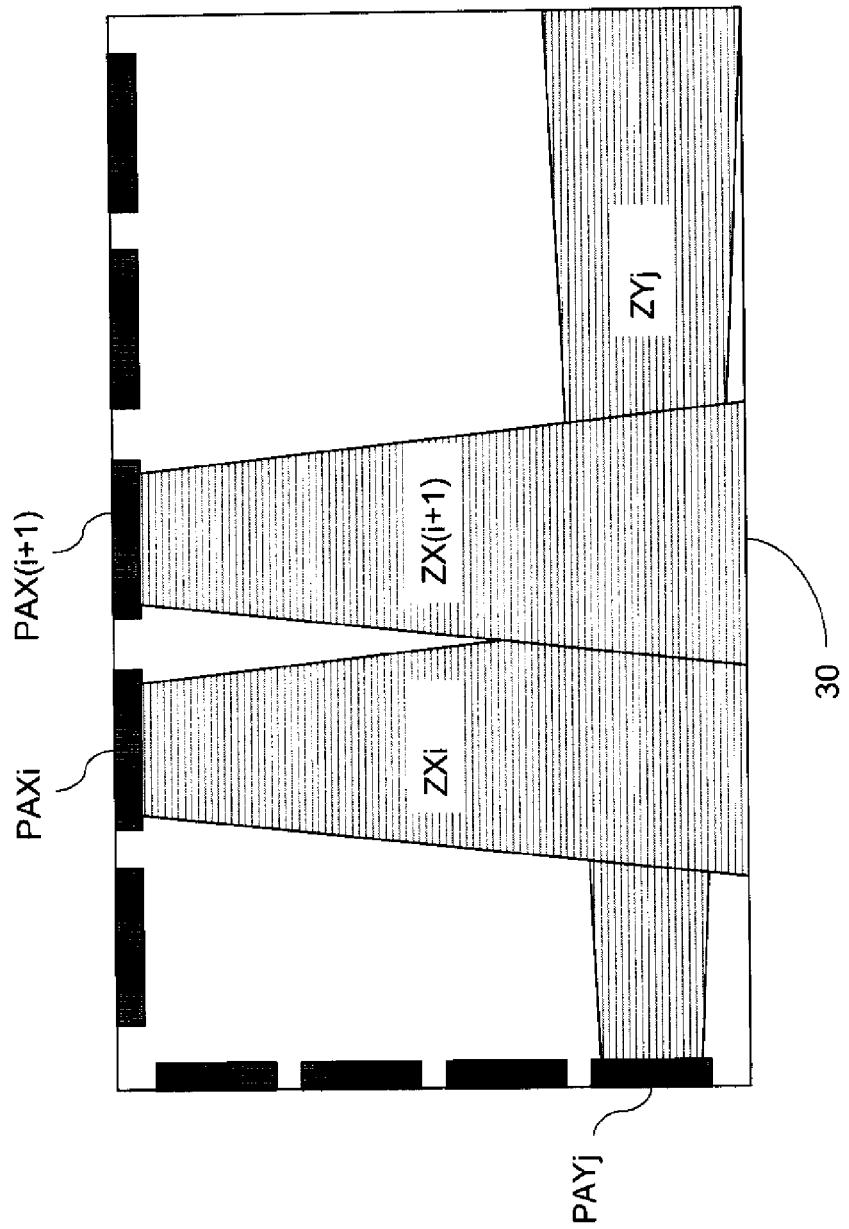
FIG. 9 is a schematic illustration of a third specific application of the system according to the invention to the locating and path-tracking of persons in a defined space, which is shown as a top view in the figure.

In this application described with reference to FIG. 9, which shows a top view of a premises, with observation areas ZYj and ZXi, respectively, being distributed in first and second transverse series of successive volumes of the premises, each of the volumes of the first and second series of volumes being defined by walls of the premises and situated between two substantially vertical planes.

In other words, the various observation areas XYj of the first series form successive vertical "slices" of the volume of the premises and the various observation areas ZXi of the second series likewise form successive vertical "slices" of the volume of the premises, but transverse in relation to the slices ZYj. In this way, the entire volume of the premises can be monitored.

In order to accomplish this, a transmitting/receiving device is associated with each observation area thus defined, ZYj, ZXi, respectively, which includes a pair of antennas, PAYj, PAXi, respectively, making it possible to monitor the particular volume consisting of the observation area in question. Each pair of antennas may then be of the same type as that already described with reference to the aforesaid application for detecting the nominal position of the driver's head prior to triggering an airbag, and will be arranged along two of four walls of the premises, as shown in FIG. 9, so as to cover the entire surface area of the premises, the radiation pattern between two pairs of adjoining antennas, e.g., PAXi and PAX(i+1) being capable of overlapping one another partially.

In this particular application, the measurement of the reference echoes of areas ZYj and ZXi will be carried out first of all upon start-up of the device, during an initialisation phase executed in the absence of the person (or object) being monitored, or else during periods of movement of the person, by implementing the principles already explained previously.

In the same was as for the preceding application example, each transmitting/receiving device is intended to measure, at regular intervals, the amplitude, or the phase, or else the amplitude and the phase of the reflected signal coming from the associated observation area, thereby forming the instantaneous echo.

The processing steps carried out by the computer on the data collected by each transmitting/receiving device associated with each observation area ZYi and ZXi are identical to those already described with reference to FIG. 4, whereby, for each of the observation areas, a piece of presence information is collected as well as a piece of movement information for the person in the area.

This information in each of the observation areas is then submitted to the processing means in order to be merged. The processing operations carried out may then enable a person to be accurately located within the premises, by cross-referencing the information derived from the observation areas. To illustrate, for example, a person situated at the interface between an observation area ZYj and an observation area ZYi may be located. Depending on the logic operations carried out on the presence and movement information collected in each of the observation areas, it may also be possible to further refine the analysis, for example, so far as to count the number of persons present in the premises, or else follow the pathway of one or more persons in the premises, while partially reconstructing the activity thereof by using knowledge of the destination and layout of the premises.

The invention claimed is:

1. System for detecting a mobile or immobile entity in a defined space, comprising:
   a presence detector for detecting a presence of said entity in at least two partially overlapping observation areas of said space, said presence detector collecting at least one piece of immobile presence information of this entity, irrespective of a movement thereof, and at least one piece of movement information of said entity in each of said observation areas, wherein the at least one piece of immobile presence information is a logical variable indicating a presence or absence of the entity, and wherein the at least one piece of movement information is a logical variable indicating a movement or absence of movement of the entity;
   a processor, for merging by logic operations the at least one piece of immobile presence information and the at least one piece of movement information of each entity collected for each of said observation areas, and generating a logic signal as result of the merging; and
   a decision maker, which is connected to the processor for controlling an action in accordance with the logic signal.

2. System of claim 1, wherein the presence detector comprises:
   a device for transmitting and receiving signals, which is specific to each observation area, including at least one transmitting element for transmitting signals in one of said observation areas associated with at least one receiving element for picking up an instantaneous echo consisting of the reflected signals coming from said observation area,
   means of storing a reference echo for each observation area, which is representative of reflected signals coming from each of said areas in an absence of said entity,
   means of comparing said instantaneous echo and said reference echo for each observation area, which are suitable for producing at least one of said presence and movement information of said entity in said observation area.

3. System of claim 2, wherein the transmitting and receiving device includes a radiofrequency transmitter/receiver circuit including a radiofrequency signal generator coupled with at least one antenna system forming the transmitting element for transmitting the signals to at least one radiofrequency sensor forming the receiving element, which is connected to an analog-to-digital converter by an amplifier and a low-frequency filter.

4. System as claimed in claim 2, wherein the of comparing means are suitable for carrying out a subtraction operation between an amplitude or a phase, or the amplitude and the phase of said echoes.

5. System as claimed in claim 1, wherein a first observation area corresponds to the total volume of said space and in that a second observation area is included in a volume of said space, which is defined by walls of said space and situated between two substantially horizontal planes.

6. System of claim 5, wherein said substantially horizontal planes are arranged at approximately 0.8 m and 1.5 m from a floor of said space, respectively.

7. System as claimed in claim 1, comprising a plurality of observation areas divided into first and second transverse series of successive volumes of said space, each of said volumes of said first and second series of volumes being defined by walls of said space and situated between substantially vertical planes.

8. System as claimed in claim 1, wherein a first observation area includes a volume situated between two vertical planes perpendicular to a first direction (XX'), and in that a second observation area includes a volume situated between two horizontal planes parallel to the first direction, and in that a third observation area includes a volume situated between two vertical planes parallel to the first direction.

9. A method comprising using the system of claim 8 to prevent an untimely triggering of an airbag present in the passenger compartment of a motor vehicle travelling on a road oriented in the first direction.

10. A method comprising using the system of claim 7 to locate accurately an entity in a premises forming said space.

11. A method comprising using the system as claimed in claim 5 to identify an emergency situation in a premises forming said space for monitoring a person at home.

12. Method of detecting a mobile or immobile entity in a defined space, the method comprising:
   detecting a presence of said entity in at least two partially overlapping observation areas of said space, so as to collect at least one piece of immobile presence information of said entity, irrespective of a movement thereof, and at least one piece of movement information of said entity in each of said observation areas, wherein the at least one piece of immobile presence information is a logical variable indicating a presence or absence of the entity, and wherein the at least one piece of movement information is a logical variable indicating a movement or absence of movement of the entity;
   merging, by logic operations, the at least one piece of immobile presence and movement information of said entity collected for each of said observation areas, so as to generate a logic signal;

analysing said logic signal so as to control an action in accordance with said logic signal.

13. Method of claim 12, wherein, for each of said observation areas in question, the step of detecting includes:
measuring and storing a reference echo representative of reflected signals in said area in an absence of said entity;
measuring an instantaneous echo consisting of the reflected signals coming from said observation area; and
comparing between the instantaneous echo and the reference echo for each area, consisting in measuring variations in amplitude and phase between said echoes, so as to generate said immobile presence and movement information of said entity in said observation area.

14. Method of claim 13, wherein the step of comparing between the instantaneous echo and the reference echo is carried out by a subtraction operation between the amplitude and the phase of said echoes.

15. Method as claimed in claim 13, wherein the step of measuring the reference echo representative of the reflected signals in said area in the absence of said entity is carried out when the space is empty.

16. Method as claimed in claim 13, wherein the step of measuring the reference echo representative of the reflected signals in said area in the absence of said entity results from a processing operation applied to a plurality of instantaneous echoes picked up in the presence of said mobile entity in said space.

* * * * *